US008243046B2

(12) United States Patent
Lee et al.

(10) Patent No.: US 8,243,046 B2
(45) Date of Patent: Aug. 14, 2012

(54) ELECTROPHORESIS DISPLAY DEVICE

(75) Inventors: Jong Kwon Lee, Anyang-si (KR); Seung Saok Nam, Seoul (KR); Sang Soo Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 338 days.

(21) Appl. No.: 12/629,460

(22) Filed: Dec. 2, 2009

(65) Prior Publication Data
US 2010/0164903 A1 Jul. 1, 2010

(30) Foreign Application Priority Data
Dec. 30, 2008 (KR) ................ 10-2008-0137318

(51) Int. Cl.
*G06F 3/045* (2006.01)
(52) U.S. Cl. ........... 345/174; 345/173; 345/177; 345/84
(58) Field of Classification Search .......... 345/173–179
See application file for complete search history.

(56) References Cited

U.S. PATENT DOCUMENTS

| 6,091,406 | A  | * | 7/2000  | Kambara et al. .......... 345/177 |
| 6,587,097 | B1 | * | 7/2003  | Aufderheide et al. ....... 345/173 |
| 6,798,483 | B2 | * | 9/2004  | Lee et al. ................ 349/141 |
| 7,034,783 | B2 | * | 4/2006  | Gates et al. .............. 345/84 |
| 2006/0181492 | A1 | * | 8/2006 | Gates et al. .............. 345/84 |
| 2008/0006453 | A1 | * | 1/2008 | Hotelling .............. 178/18.06 |
| 2009/0102802 | A1 | * | 4/2009 | Pietri et al. ............ 345/173 |
| 2009/0115741 | A1 | * | 5/2009 | Wang et al. ............. 345/173 |
| 2009/0256821 | A1 | * | 10/2009 | Mamba et al. ............ 345/174 |
| 2009/0278810 | A1 | * | 11/2009 | Ma et al. ............... 345/173 |
| 2010/0097346 | A1 | * | 4/2010 | Sleeman ................ 345/174 |
| 2010/0108409 | A1 | * | 5/2010 | Tanaka et al. .......... 178/18.06 |
| 2010/0141591 | A1 | * | 6/2010 | Lin .................... 345/173 |
| 2010/0182273 | A1 | * | 7/2010 | Noguchi et al. .......... 345/174 |

OTHER PUBLICATIONS

JP 2009244958 Noguchi Oct. 22, 2009.*

* cited by examiner

*Primary Examiner* — Van Chow
(74) *Attorney, Agent, or Firm* — Brinks Hofer Gilson & Lione

(57) ABSTRACT

An electrophoresis display device adapted to prevent sensing errors and to reduce electric power consumption is disclosed. The electrophoresis display device includes a thin film transistor array substrate and an ink film. The thin film transistor array substrate includes a sensor configured to generate a sensing signal, and an output transistor configured to be connected to the sensor and to control the output of the sensing signal. The ink film includes a common electrode and an ink layer, which are formed on one side surface of a base film, and a floating electrode formed on the other side surface of the base film. The output transistor outputs the sensing signal when a touch current is generated on the floating electrode. The electrophoresis display device only outputs the sensing signal when a substantial touch occurs. Therefore, the electrophoresis display device can prevent sensing errors and reduce electric power consumption.

5 Claims, 4 Drawing Sheets

ELECTROPHORESIS DISPLAY DEVICE

CROSS-REFERENCE TO RELATED APPLICATION

This application claims priority under 35 U.S.C. 119 to Korean Patent Application No. 10-2008-0137318, filed on Dec. 30, 2008, which is hereby incorporated by reference in its entirety.

BACKGROUND

1. Field of the Disclosure

This disclosure relates to an electrophoresis display device capable of preventing a sensing error and reducing power consumption.

2. Description of the Related Art

Recently, display devices which can display newspapers and journals have been widely researched. An electrophoresis display device is among the display devices used for newspapers or journals. The electrophoresis display device drives electrified (or charged) corpuscles and then displays an image. In other words, the electrophoresis display device displays an image using electrophoresis.

An electrophoresis display device unified with a sensor has been recently proposed, as shown in FIGS. 1 and 2. FIG. 1 is a circuitry diagram showing an electrophoresis display device of the related art, and FIG. 2 is a cross-sectional view showing the structure of an electrophoresis display device of the related art.

As shown in FIG. 1, an electrophoresis display device includes gate lines 101 and data lines 103 arranged to cross each other on a thin film transistor array substrate. The gate lines 101 and the data lines 103 crossing each other define pixel regions. Each pixel region includes a thin film transistor 112, a sensor 114, and an output transistor 116.

The thin film transistor 112 is connected to the respective gate line 101, the respective data line 103, and a respective pixel electrode. Such a thin film transistor 112 is activated by a gate signal applied from the respective gate line 101. It then supplies the respective pixel electrode with a data voltage applied from the respective data line 103.

The pixel electrode overlaps a previous gate line to form a storage capacitor Cst. An ink layer of an ink film forms an electrophorectic capacitor Cep due to a signal. The data voltage applied to the pixel electrode is charged into the storage capacitor Cst.

The sensor 114 is connected to an off-voltage line 105 and a power supply line 107. The off-voltage line 105 always receives an off-voltage. The power supply line 107 always receives a supply voltage. The sensor 114 is driven to generate a sensing signal of a fixed level.

The output transistor 116 is connected to a respective output control line 109, a respective read-out line 110, and the respective sensor 114. The output control line 109 always receives an output control signal. Accordingly, the output transistor 116 is turned on (activated) by the output control signal. It then applies the sensing signal from the respective sensor 114 to the respective read-out line 110.

A sensing signal capacitor C is provided between gate and drain electrodes of the sensor 114. The sensing signal capacitor C charges the sensing signal generated in the sensor 114.

Referring to FIG. 2, the electrophoresis display device of the related art includes a thin film transistor array substrate 120 and an ink film 130. The thin film transistor array substrate 120 includes thin film transistors 112, pixel electrodes 124, sensors 114, and output transistors 116 arranged on a substrate 122. The ink film 130 includes a common electrode 134 formed on a base film 132 as well as the ink layer 136 formed on the common electrode 134.

The related art electrophoresis display device with the above configuration forces the sensing signal of the fixed level generated in the sensor 114 to always be output through the output transistor 116. If the electrophoresis display device is touched by a human finger, the finger blocks light from entering into a portion of the electrophoresis display device. Therefore the sensing signal generated in the sensor 114 is varied. The varied sensing signal is output through the output transistor 116. Accordingly, a detector (not shown) connected to the read-out line 110 monitors the variation of the sensing signal when the device is touched or not touched. This detector then determines whether or not the electrophoresis display device is being touched.

However, the related art display device misidentifies a touch when light incident to the sensor 114 is shielded but the sensor is not actually being touched. More specifically, even though a human finger is only positioned above the ink film 130 but does not touch it, light is prevented from entering into the sensor 114, thereby generating an error which allows the detector to wrongly identify the touch of human finger. In other words, whenever light is shielded by any object, not merely human finger, the related art electrophoresis display device identifies a touch regardless of whether or not the device is actually being touched.

In addition, the related art electrophoresis display device always applies the output control signal to the gate electrode of the output transistor 116 in case the touch function is not used. Accordingly, electric power consumption is increased in the related art electrophoresis display device.

SUMMARY

According to one general aspect of the present embodiment, an electrophoresis display device includes: a thin film transistor array substrate having a sensor configured to generate a sensing signal, and an output transistor configured to connect the sensor and to control the output of the sensing signal; and an ink film having a common electrode and an ink layer sequentially formed on a first side surface of a base film, and a floating electrode formed on a second side surface of the base film, wherein the output transistor outputs the sensing signal when a touch current is generated on the floating electrode Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
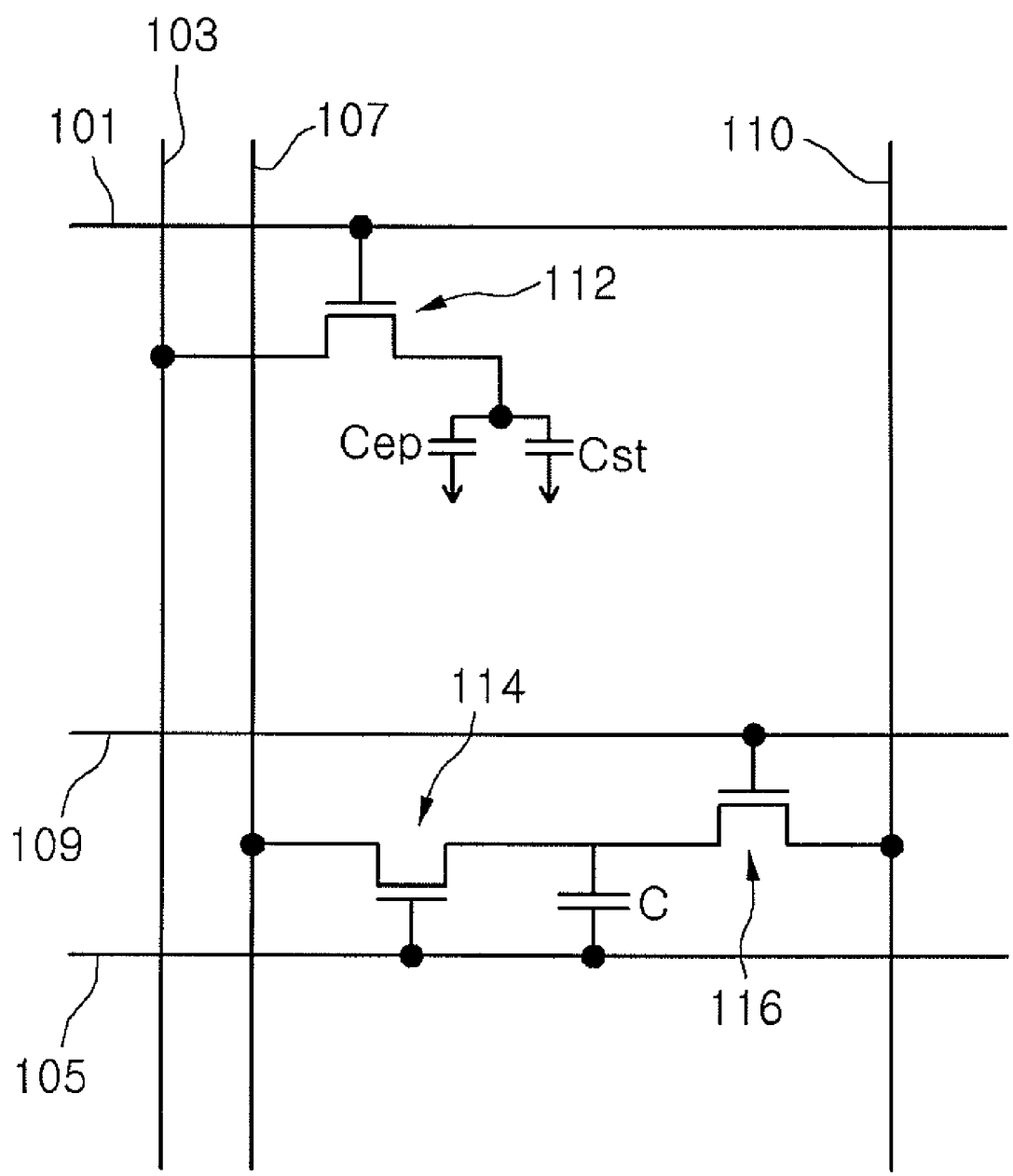
FIG. 1 is a circuitry diagram showing an electrophoresis display device of the related art.
Figure 2:
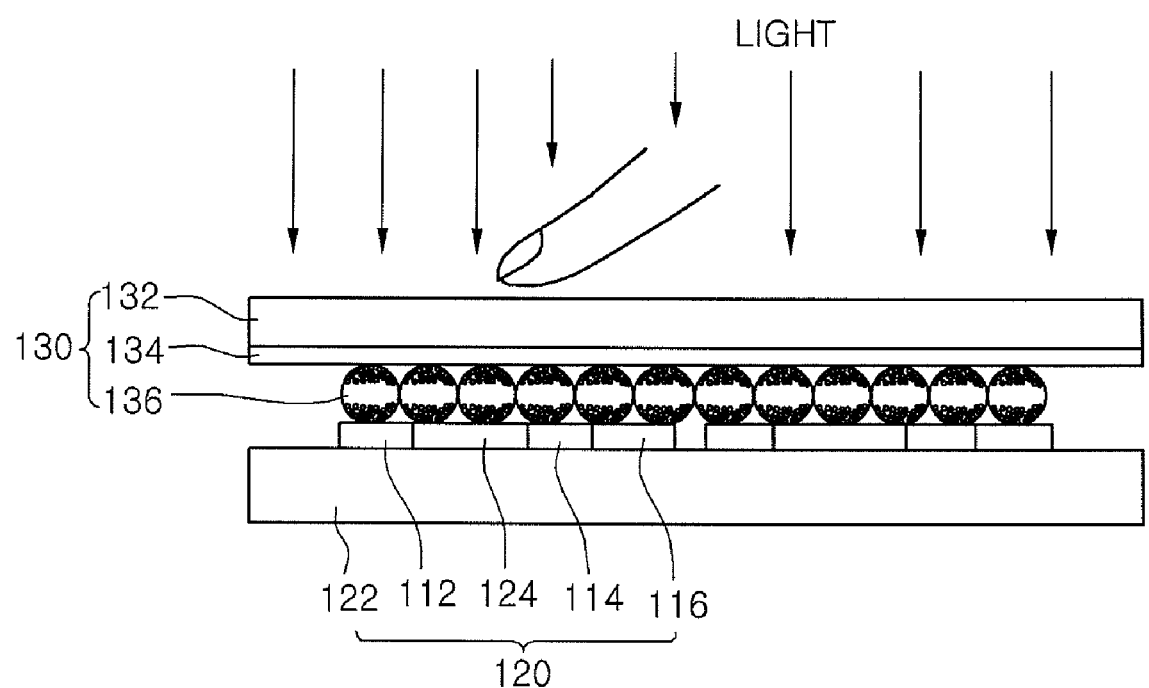
FIG. 2 is a cross-sectional view structurally showing an electrophoresis display device of the related art.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 3:
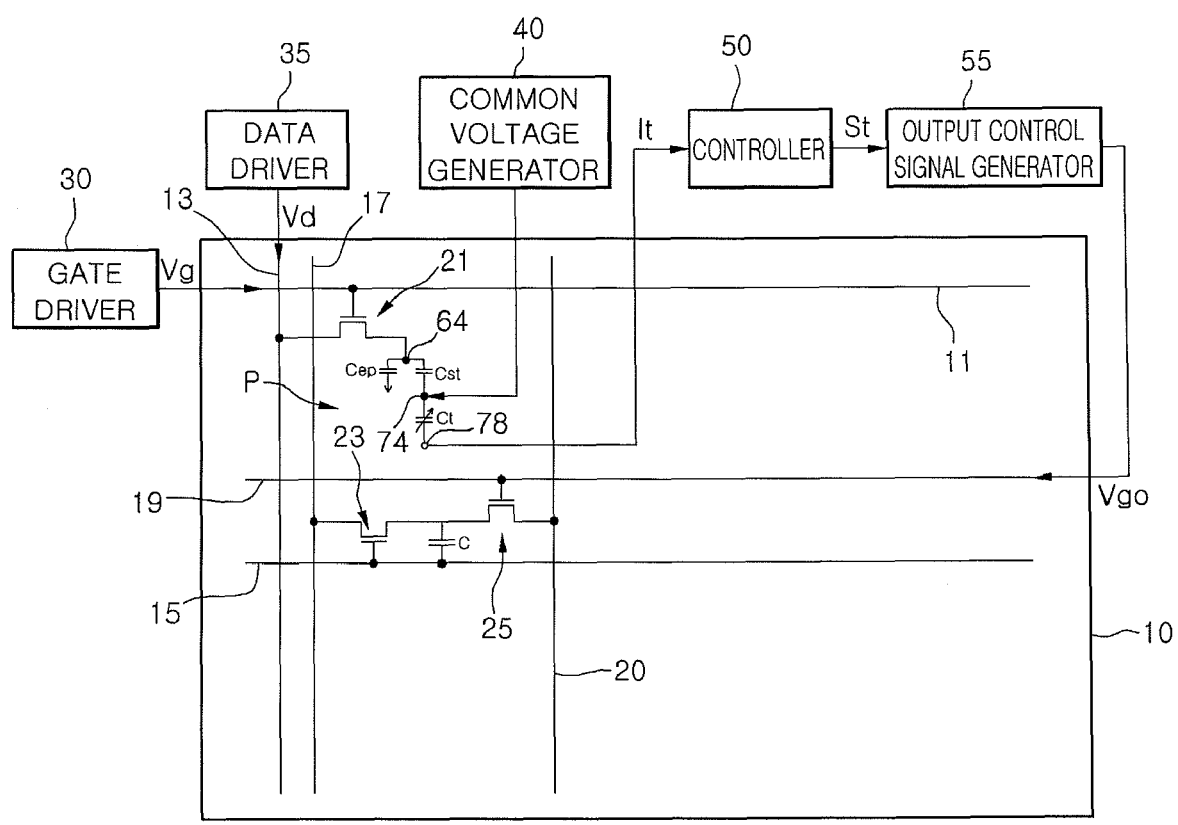
FIG. 3 is a block diagram showing an electrophoresis display device according to an embodiment of the present disclosure.
Figure 4:
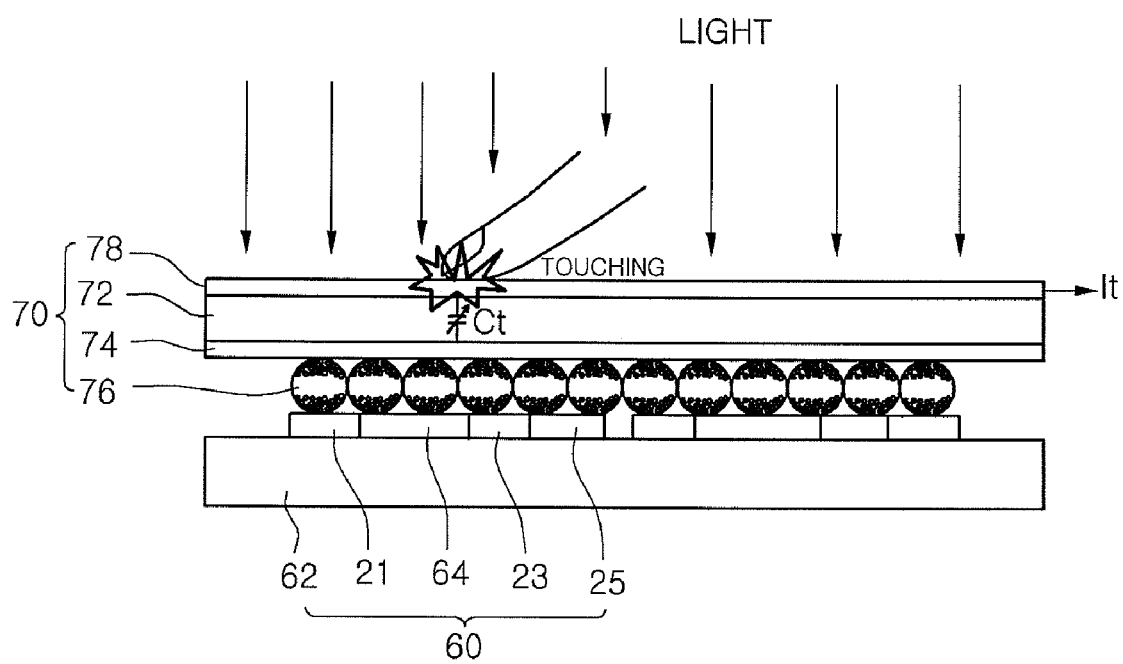
FIG. 4 is a cross-sectional view showing the electrophoresis display device of FIG. 3.

FIG. 3 is a block diagram showing an electrophoresis display device according to an embodiment of the present disclosure. FIG. 4 is a cross-sectional view showing the electrophoresis display device of FIG. 3. Referring to FIG. 3, an electrophoresis display device according to an embodiment of the present disclosure includes an electrophoresis display panel 10, a gate driver 30, a data driver 35, a common voltage generator 40, a controller 50, and an output control signal generator 55.

The electrophoresis display panel 10 includes a plurality of gate lines 11 and a plurality of data lines 13 arranged to cross each other. The gate lines 11 and the data lines 13 crossing each other may define pixel regions P. In addition to the gate and data lines 11 and 13, a plurality of lines 15, 17, 19, and 20 further are arranged on the pixel region P. More specifically, an off-voltage line 15 and an output control line 19 can be arranged parallel to the gate line 11. A power supply line 17 and a read-out line 20 can be arranged parallel to the data line 13. Furthermore, a thin film transistor 21, a storage capacitor Cst, an electrophoretic capacitor Cep, a sensor 23, a sensing signal capacitor C, and an output transistor 25 can be formed on the pixel region P.

The thin film transistor 21 is connected to the gate line 11 and the data line 13. The thin film transistor 21 can also be connected to a pixel electrode 64. The pixel electrode 64 can overlap a previous gate line 11 in order to form the storage capacitor Cst. The thin film transistor 21 is activated (or turned on) by a gate signal Vg applied from the gate line 11. The activated thin film transistor 21 then allows a data voltage Vd from the data line 13 to be applied to the pixel electrode 64 through it. The data voltage Vd applied to the pixel electrode 64 may be charged into the storage capacitor Cst.

The sensor 23 is connected to the off-voltage line 15 and the power supply line 17. The output transistor 25 is connected to the output control line 19 and the read-out line 20. The sensing signal capacitor C can be formed between a gate electrode and a drain electrode of the sensor 23. The sensor 23 can be activated by an off-voltage applied to the off-voltage line 15 and a supply voltage applied to the power supply line 17. This can then generate a sensing signal. The sensing signal can include a drive current derived from the supply voltage as well as a light current induced by external light.

When a human finger touches the electrophoresis display panel 10, it shields light from entering the sensor 23. At this time, the sensing signal only includes the drive current derived from the supply voltage. In other words, the sensing signal when touched is different in level from the signal when there is no touch. Accordingly, a touch or no touch may be identified by varied levels of the sensing signal. Such a sensing signal generated in the sensor 23 can be charged into the sensing signal capacitor C. The sensing signal charged in the sensing signal capacitor C can be output to the read-out line 20 when the output transistor 25 is turned on by an output control signal Vgo applied in the output control line 19.

The electrophoresis display device of the present embodiment enables any signal not to be applied to the output control line 19 during a normal state (or in a normal mode), that is, during no touch state. As such, the output transistor 25 can maintain turn-off during the normal state.

Likewise, the electrophoresis display device of the present embodiment can force the output control signal Vgo of a high level to be applied to the output control line 19 only when a touch substantially occurs. Then, the output transistor 25 can be turned on by the high level output control signal Vgo in order to output the sensing signal generated in the sensor 23.

Figure 5:
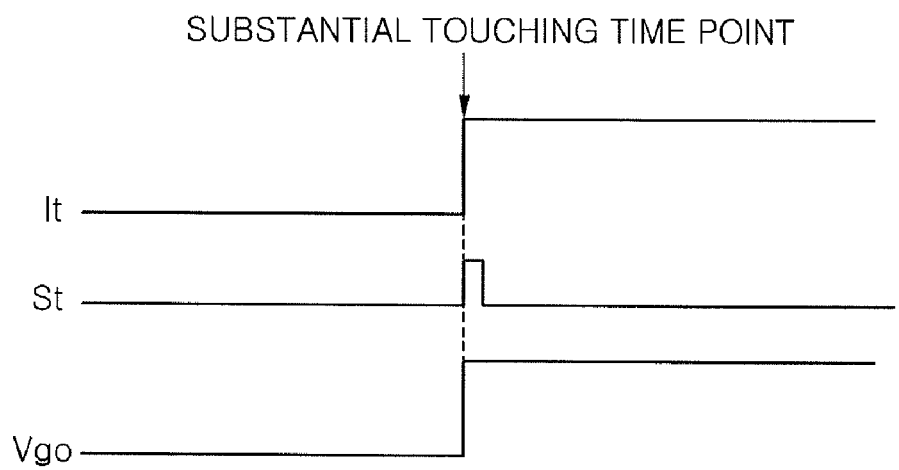
FIG. 5 is a waveform diagram showing signals for controlling the output of a sensing signal in the electrophoresis display device of FIG. 3.

The electrophoresis display device can include the electrophoretic capacitor Cep formed in an ink layer 76 between the pixel electrode 64 on a thin film transistor array substrate 60 and a common electrode 74 on an ink film 70, as shown in FIG. 4. Also, the electrophoresis display device may include a touch capacitor Ct configured to serially connect to the electrophoretic capacitor Cep. The touch capacitor Ct can only generate a touch current It when it is actually touched by a human finger. In other words, the touch current It is generated under an actual touch, but is not generated otherwise (or under an insignificant or slight touch), as shown in FIG. 5.

The controller 50 monitors whether or not the touch current It is generated. When the touch current It is generated, the controller 50 generates a touch control signal St having a high level pulse.

The output control signal generator 55 responds to the touch control signal St and generates the output control signal Vgo of a high level. This signal is in turn applied to the output control line 19. Then, the output transistor 25 is turned on by the high-level output control signal Vgo in order to output the sensing signal from the sensor 23 to the read-out line 20.

In this manner, the electrophoresis display device of the present embodiment only outputs a sensing signal under an actual (or forceful) touch, but does not otherwise generate the sensing signal. Accordingly, an error of the sensing signal can be prevented.

The gate driver 30 generates a gate signal Vg to be applied to the gate line 11. The data driver 35 generates a data voltage Vd to be applied to the data line 13. The common voltage generator 40 generates a common voltage Vcom to be applied to the common electrode 74 on the ink film 70.

As such, the thin film transistor 21 is turned on when the gate signal Vg is applied to the gate line 11. This then transfers the data voltage applied to the data line 13 toward the pixel electrode 64. On the other hand, the common voltage Vcom is applied to the common electrode 74 of the ink film 70. Accordingly, white particles and black particles injected into the ink layer 76 of the ink film 70 move toward the pixel electrode 64 or the common electrode 74. This occurs by way of the data voltage Vd and common voltage Vcom which are applied to the pixel electrode 64 and the common electrode 74. The result is the display of white or black color.

The common voltage Vcom may be a direct current voltage which maintains a fixed level. On the contrary, the data voltage Vd can alternately have a positive polarity voltage and a negative polarity voltage with respect to the common voltage Vcom every frame. Applying the positive polarity voltage and the negative polarity voltage in an alternating fashion as the data voltage Vd can prevent the deterioration of the ink layer 76 of the ink film 70.

Referring to FIG. 4, the electrophoresis display device of the present embodiment includes a thin film transistor array substrate 60 and an ink film 70.

The thin film transistor 60 can include thin film transistors 21, sensors 23, and output transistors 25 which are formed on a substrate 62.

The substrate 62 may include gate lines 11 and data lines 13 arranged to cross each other. Off-voltage lines 15 and output control lines 19 can be arranged parallel to the gate lines 11 on the substrate 62. Also, power supply lines 17 and read-out lines 20 can be arranged parallel to the data lines 13 on the substrate 62. The gate lines 11 and the data lines 13 crossing each other can define the substrate 62 into pixel regions P. Each of the pixel regions P may include the thin film transistor 21, the sensor 23, and the output transistor 25.

The thin film transistor 21 may be connected to the respective gate line 11 and the respective data line 13. The thin film transistor 21 may also be connected to a pixel electrode 64. In other words, the pixel region P can further include the pixel electrode 64. Such a thin film transistor 21 is turned on by a gate signal Vg applied to the respective gate line 11. It then transfers a data voltage Vd applied to the respective data line 13 through it to the respective pixel electrode 64. Consequently, the thin film transistor 21 selects a pixel region P displaying an image. The pixel electrode 64 can overlap a previous gate line 11 in order to form a storage capacitor Cst.

The sensor 23 may be connected to the respective off-voltage line 15 and the respective power supply line 17. The sensor 23 derives a drive current from an off voltage on the respective off-voltage line 15 and a supply voltage on the respective power supply line 17. The sensor 23 may further generate a light current corresponding to light entered from the exterior. As such, the sensor 23 may generate a sensing signal including the drive current and the light current. The sensing signal can be charged into a sensing signal capacitor C which is formed between the gate and drain electrodes of the sensor 23.

If a human finger touches the electrophoresis display panel 10, it shields light from entering the sensor 23. At this time, the sensing signal only includes the drive current derived from the supply voltage because the sensor 23 cannot generate the light current which is based on external light. In other words, the sensing signal may have a varied amplitude depending on whether both the drive current and the light current are generated or only the drive current is generated. As such, the varied amplitude of the sensing signal can identify a touch or a lack of touch.

The output transistor 25 may be connected to the output control line 19, the sensor 23, and the read-out line 20. The output control line 19 receives an output control signal Vgo only when it is substantially and actually touched by a human finger. The output transistor 25 can only be turned on by such an output control signal Vgo so that the sensing signal is output from the sensor 23 or the sensing signal capacitor C to the read-out line 20. The generating operation of the output control signal Vgo will be explained in detail.

The ink film 70 includes a base film 72, a common electrode 74, and an ink layer 76. The base film 72 can be formed of a plastic material. The common electrode 74 is formed to apply a common voltage Vcom to the entire surface of a first side of the base film 72. The ink layer 76 may include a plurality of micro capsules and may be laminated to the common electrode 74. Each of the micro capsules contains white particles and black particles. These white and black particles each move toward the pixel electrode 64 and the common electrode 74 or vice versa. This occurs by way of the data voltage Vd on the pixel electrode 64 and the common voltage Vcom on the common electrode 74. This results in the display having white or black color.

The common voltage Vcom is always provided during the driving period of the electrophoresis display device. The common voltage Vcom may be a direct current voltage continuously maintaining a fixed level. In contrast, the data voltage Vd can alternately have a positive polarity voltage and a negative polarity voltage with respect to the common voltage Vcom every frame. Applying the positive polarity voltage and the negative polarity voltage in an alternating fashion as the data voltage Vd can prevent the deterioration of the ink layer 76 of the ink film 70.

Furthermore, the ink film 70 can include a floating electrode 78 formed on the entire surface of a second side of the base film 72. The floating electrode 78 can maintain a floating state which does not receive any voltage. Since the base film 72 is formed of a plastic material having a fixed dielectric constant, a touch capacitor Ct can be configured using the floating electrode 78, the base film 72, and common electrode 74.

The capacitance of the touch capacitor Ct can be varied by means of an external force, i.e., by being forcibly touched. This results form the fact that the dielectric constant of the touch capacitor Ct is varied by the external force. The varied capacitance of the touch capacitor Ct may induce a touch current It to be generated on the floating electrode 78 by means of the common voltage Vcom applied to the common electrode 74.

Such a touch current It is applied to the controller 50 shown in FIG. 3. The controller 50 identifies the touch current It and generates a touch control signal St with a high level pulse. The output control signal generator 55 responds to the touch control signal St and generates the high-level output control signal Vgo to be applied to the output control line 19. Accordingly, the output transistor 25 may be turned on (or activated) so that the sensing signal is output from the sensor 23 or the sensing signal capacitor C to the read-out line 20.

If a touch does actually not occur, i.e., when a human finger is held above the ink film 70, no touch current is generated because the capacitance of the touch capacitor Ct is not varied. In this case, the touch control signal St is not generated in the controller 50 due to no touch current and the output control signal Vgo is also not generated in the output control signal generator 55. Accordingly, the output transistor 25 maintains turn-off state.

In contrast, when a substantial touch occurs, the touch current It is generated on the floating electrode 78 due to a capacitance variation of the touch capacitor Ct. As such, the touch control signal St of a high level pulse is generated in the controller 50. Also, the output control signal Vgo of a high level is generated in the output control signal generator 55 and is applied to the output control line 19. Therefore, the output transistor 25 can be turned on (or activated) and can enable the sensing signal to be output from the sensor 23 or the sensing signal capacitor C to the read-out line 20.

Alternatively, the touch capacitor Ct may have constant capacitance or resistance differently from the variable capacitor. In other words, the floating electrode 78 can have a ground voltage when it is touched with a human finger. In this case, a touch current can be generated on the floating electrode 78 by means of the common voltage Vcom applied to the common electrode 74 and the ground voltage generated on the floating electrode 78.

As described above, the electrophoresis display device according to an embodiment of the present disclosure only outputs the sensing signal when a substantial touch occurs. Therefore, the electrophoresis display device can prevent sensing errors.

Also, the electrophoresis display device according to the embodiment of the present disclosure only applies the output control signal Vgo to the output transistor when a substantial touch occurs. In other words, the electrophoresis display device does not apply the output control signal Vgo to the output transistor. As such, the electrophoresis display device can reduce electric power consumption.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

What is claimed is:

1. An electrophoresis display device comprising:
    a thin film transistor array substrate having a sensor configured to generate a sensing signal, and an output transistor configured to connect the sensor and to control the output of the sensing signal;
    an ink film having a common electrode and an ink layer sequentially formed on a first side surface of a base film, and a floating electrode formed on a second side surface of the base film;
    wherein the common electrode, the base film, and the floating electrode configure a touch capacitor and the floating electrode of the touch capacitor is connected with the controller, and
    wherein the output transistor outputs the sensing signal when a touch current is generated on the floating electrode.

2. The electrophoresis display device according to claim 1, wherein the capacitance of the touch capacitor varies when being touched and the capacitor then generates the touch current on the floating electrode.

3. The electrophoresis display device according to claim 1, wherein the floating electrode has a ground voltage and the touch current is generated on the floating electrode by a common voltage applied onto the common electrode, when being touched.

4. The electrophoresis display device according to claim 1, further comprising
    a controller configured to identify the touch current and to generate a touch control signal of a high level; and
    an output control signal generator configured to respond to the touch control signal and to generate an output control signal of a high level,
    wherein the output transistor is turned on by the output control signal.

5. The electrophoresis display device according to claim 1, wherein the base film comprises a plastic material with a fixed dielectric constant.

* * * * *